United States Patent Office 3,501,995
Patented Mar. 24, 1970

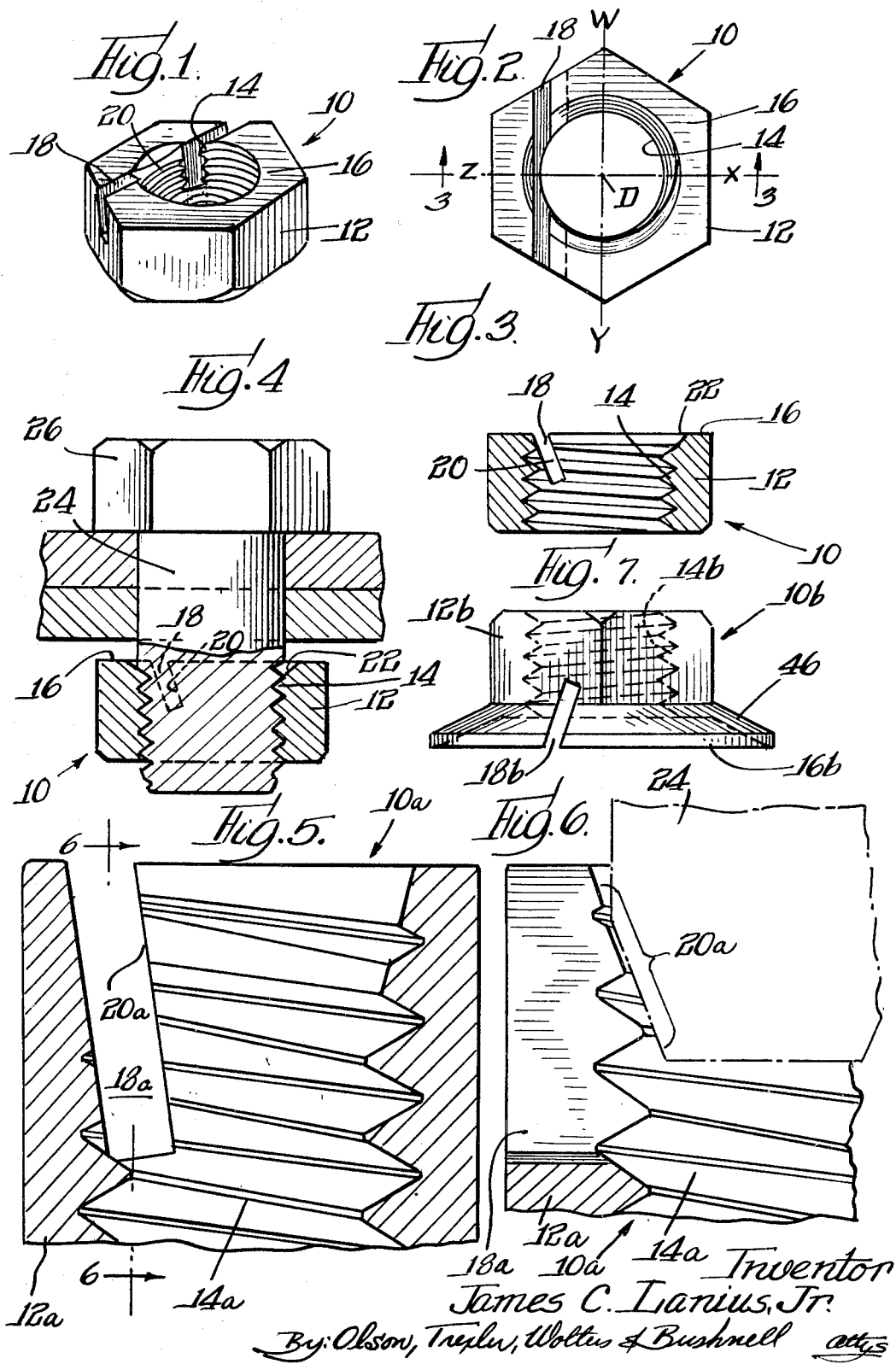

3,501,995
THREAD-CUTTING NUT
James Curtis Lanius, Jr., Elgin, Ill., assignor to Illinois Tool Works Inc., Chicago, Ill., a corporation of Delaware
Filed Dec. 2, 1968, Ser. No. 780,358
Int. Cl. F16b 37/00
U.S. Cl. 85—32    10 Claims

ABSTRACT OF THE DISCLOSURE

This invention relates generally to thread-cutting nuts and the embodiment disclosed herein contemplates a conventional nut body having internal thread convolutions. Completely traversing the clamping side of the nut body is a slot or recess which, at said clamping side, is substantially tangent to the immediately adjacent thread convolution. The slot has a depth which is sufficient to cut a full thread form in a shank or stud member and is inclined from the face of the nut toward the nut axis and terminates short of said axis. With this slot arrangement, a cutting edge is produced for effectively generating a full thread form on the periphery of an unthreaded stud member.

DISCLOSURE

It is an object of the present invention to provide a unique, practical and improved slotted nut device which, when rotatably applied to an unthreaded stud member will assure the formation of complete thread convolutions on a stud periphery.

More specifically, the invention contemplates a thread-cutting nut of the type referred to above, wherein a novel, serrated cutting edge is produced in the nut which serves to increase the cutting efficiency or effectiveness of the nut in forming full, complementary thread convolutions upon an unthreaded stud member.

It is a further object of the present invention to produce a thread-cutting nut which, after application to an unthreaded stud member, will possess increased stripping torque due to the formation of complete or full complementary thread convolutions.

The foregoing and other objects and advantages will be more apparent from the following detailed description when considered in connection with the accompanying drawing, wherein:

FIG. 1 is a perspective view of a thread-cutting nut which is constructed in accordance with the teachings of the present invention;

FIG. 2 is a plan view of the nut as shown in FIG. 1;

FIG. 3 is a central transverse sectional view of the nut taken substantially along the line 3—3 of FIG. 2;

FIG. 4 discloses the nut of FIGS. 1–3 inclusive in operative association with a stud member;

FIG. 5 is an enlarged fragmentary transverse sectional view of an internally threaded nut member of modified form having a slot, the inclination of which, with respect to the nut axis, is less than that shown in FIG. 3;

FIG. 6 is a fragmentary vertical sectional view taken substantially along the line 6—6 of FIG. 5, an unthreaded stud member being shown in initial telescopic association with the serrated cutting edge of the nut; and FIG. 7 is a side elevational view of a modified form of thread-cutting nut which is slotted in accordance with the teachings of the present invention.

Referring now to the drawing more in detail, wherein like numerals have been employed to designate similar parts throughout the various figures, it will be seen that one embodiment of the present invention includes a nut member designated generally by the numeral 10, FIGS. 1–4, inclusive. The nut 10 includes a conventional annular nut body 12 with internal thread convolutions 14. The nut 12 has a clamping face or side 16 which is coincident with a plane normal to the nut axis.

The clamping side 16 of the nut is traversed by a slot or recess 18 which extends axially from said side partially through the nut so as to traverse internal thread convolutions 14. It will also be noted that the slot, particularly in the vicinity of the clamping side 16, is substantially tangent to the thread convolution adjacent said side and is inclined from the line of intersection of the slot with the clamping side toward a plane coincident with the nut axis so as to provide an aggressive serrated cutting edge 20. In view of the fact that the clamping side or face 16 of the nut 12 is coincident with a plane normal to the nut axis, it may be stated that the slot 18 is inclined toward a plane which is not only coincident with the nut axis but which is also parallel to the line of intersection of the slot 18 with the face 16.

It has been found advantageous to provide an annular chamfer 22 adjacent the advancing side of the nut 12. This chamfer facilitates the initial telescopic association and aggressive impingement of the serrated cutting edge 20 with an unthreaded shank or stud member 24 as shown in FIG. 4. It is also preferable to have the entering extremity of the unthreaded stud or shank member 24 chamfered as shown in FIG. 4. This tapered entering extremity of the stud 24 also serves to enhance the aggressiveness of impingement of the serrated thread-cutting edge 20 of the nut with the unthreaded stud member. In FIG. 4, the thread-cutting nut 12 is shown as being partially applied to the stud or shank 24 of a bolt. Obviously it would be necessary in such applications to secure the head 26 of the bolt against rotation as the nut 12 is rotated to cut the thread on the stud periphery.

In FIGS. 5 and 6 a thread-cutting nut of slightly modified form is illustrated, said nut being designated generally by the numeral 10a. This nut has a body 12a which is traversed by a slot or recess 18a in a manner similar to the previously described slot 18. The only difference in the slot shown in FIGS. 5 and 6 and the slot shown in FIGS. 1–4 inclusive, is in the degree of angularity with respect to the nut axis and also with respect to the depth of the slot. It has been found practical to employ slots having a degree of inclination to the nut axis as high as 45°. In fact, the angular relationship between the slot and nut axis may vary between 0° to 45°. All other structural features or elements of the thread-cutting nut 10a are indicated by numerals bearing the suffix a corresponding with the numerals used in identifying similar parts in FIGS. 1–4 inclusive.

In FIG. 6, which is a fragmentary sectional view of the nut 10a, the serrated cutting edge thereof is clearly shown in association with an unthreaded shank member 24 having a chamfered or tapered entering extremity. The entering end of the shank and the threaded aperture of the nut are shown in their relative initial position of telescopic association.

FIG. 7 discloses another modified form of thread-cutting nut designated generally by the numeral 10b. The nut 10b has all of the physical thread-cutting characteristics of the previously described nuts and differs only therefrom in the provision of an annular flange 46 radiating outwardly from the nut periphery adjacent the clamping side thereof. The nut 10b includes a conventional nut body 12b having internal threads 14b and a clamping side 16b. A transverse recess or slot 18b conforms with the slots 18 and 18a previously mentioned. The thread-cutting nut 10b not only performs the function of thread-cutting, but also the function of tightening the annular flange 46 against a work surface. The annular frustoconical flange 46 provides space for accommodating chips formed during the thread-cutting operation. If the flange is sufficiently thin, it may serve as resilient means for securing the nut against unauthorized retrograde movement.

From the foregoing, it will be apparent that the present invention contemplates a unique, improved, thread-cutting nut which, because of the novel arrangement of the serrated cutting edge, will perform very efficiently in cutting threads upon an unthreaded stud periphery. The thread-cutting section of the above-described nut is generated by the slot 18, 18a and 18b, angled from the vertical. This produces a serrated cutting edge, and the depth of the slot should be sufficient to cut a full thread form in the stud periphery. Referring to FIG. 2, it will be seen that it is preferable for the slot to be parallel to the center line W, D, Y and to be perpendicular to the center line X, D, Z. The serrated cutting edges 18, 18a and 18b should fall within the quadrant represented by the letters W, D, Z for a right hand threaded nut. The thread-cutting nut made in accordance with the present invention is preferably case-hardened and the cutting edge generates a well-formed thread upon the unthreaded stud. In other words, a nut produced in accordance with this invention will form a thread equivalent to a machined thread on a stud of proper diameter. The thread-cutting nuts contemplated hereby produce a full depth thread which increases the stripping torque compared with that of conventional nuts applied to prethreaded stud members.

The invention is claimed as follows:

1. A thread-cutting nut member including a nut body having internal thread convolutions and a clamping side substantially coincident with a plane normal to the nut axis, said clamping side being traversed by a slot which extends axially from said clamping side partially through the nut body transversely of said internal thread convolutions, said slot in the vicinity of the clamping side being substantially tangent to the thread convolution adjacent said side and angularly disposed with respect to the nut axis from the line of intersection of the slot with the clamping side toward but terminating short of a plane coincident with the nut axis so as to provide an aggressive serrated cutting edge.

2. A thread-cutting nut member as set forth in claim 1, wherein the slot completely traverses the clamping side of the nut.

3. A thread-cutting nut member as set forth in claim 1, wherein the advancing side of the nut member in the vicinity of the adjacent thread convolution is chamfered to facilitate initial application of the nut to the entering extremity of a stud member.

4. A thread-cutting nut member as set forth in claim 1, wherein the slot is inclined toward a plane which is not only coincident with the nut axis, but it is also parallel with the line of intersection of the slot with the clamping side of the nut.

5. A thread-cutting nut member as set forth in claim 1, wherein the clamping side of the nut presents a flat surface which is normal to the nut axis.

6. A thread-cutting nut member as set forth in claim 1, wherein the clamping side of the nut is provided with an annular space surrounding the nut aperture.

7. A thread-cutting nut member as set forth in claim 1, wherein the clamping side of the nut is provided with an annular flange radiating from the periphery of the nut.

8. A thread-cutting nut member as set forth in claim 7, wherein the radiating nut flange is substantially frusto-conical in cross-section.

9. A thread-cutting nut member as set forth in claim 1, wherein the incliniation of the slot with respect to the nut axis does not exceed 45°.

10. A thread-cutting nut member as set forth in claim 1, wherein the inclination of the slot with respect to the nut axis is less than 45°.

References Cited

UNITED STATES PATENTS

| 561,913 | 6/1896 | Paquette. |
| 689,555 | 12/1901 | Mann. |
| 1,804,058 | 5/1931 | Micha. |
| 2,178,803 | 11/1939 | Most. |
| 3,350,975 | 11/1967 | Bien _____ 85—32 |

FOREIGN PATENTS

| 806,397 | 6/1951 | Germany. |
| 29,849 | 10/1903 | Switzerland. |

MARION PARSONS, Jr., Primary Examiner

U.S. Cl. X.R.

10—111